United States Patent

Manos et al.

Patent Number: 5,842,924
Date of Patent: Dec. 1, 1998

[54] THREAD REPAIRING TOOL

[76] Inventors: Mark R. Manos, 2604 Bern Ct., Woodridge, Ill. 60517; David Kendzior, 3513 Fairview, McHenry, Ill. 60050

[21] Appl. No.: 805,947
[22] Filed: Feb. 25, 1997
[51] Int. Cl.⁶ .................................................. B21J 13/02
[52] U.S. Cl. .......................................... 470/198; 408/58
[58] Field of Search ....................... 470/18, 96, 198–204; 408/58, 222

[56] References Cited

U.S. PATENT DOCUMENTS

| | | | |
|---|---|---|---|
| 2,053,253 | 9/1936 | Dennis et al. | 470/198 |
| 2,388,022 | 10/1945 | Tucker et al. | 470/198 |
| 2,795,221 | 6/1957 | Braended | 470/198 |
| 5,253,961 | 10/1993 | Geissler . | |
| 5,259,706 | 11/1993 | Gaut . | |
| 5,281,059 | 1/1994 | Stuckle . | |
| 5,413,438 | 5/1995 | Turchan . | |
| 5,544,985 | 8/1996 | Lane . | |

FOREIGN PATENT DOCUMENTS

| | | | |
|---|---|---|---|
| 3003694 | 8/1981 | Germany | 408/58 |
| 61-136726 | 6/1986 | Japan | 470/198 |
| 62-130112 | 6/1987 | Japan | 408/58 |
| 251458 | 8/1948 | Switzerland | 470/198 |
| 92107678 | 5/1992 | WIPO | 470/198 |

Primary Examiner—Joseph J. Hail, III
Assistant Examiner—Ed Tolan
Attorney, Agent, or Firm—Michael R. McKenna

[57] ABSTRACT

A tool for repairing damaged threads within a bore. A generally cylindrically shaped tool body includes a threaded section at its bottom end, and an axial bore extending from a point adjacent the bottom end of the tool body to an upper terminal point in a higher portion of the tool body. The bore is closed off at its bottom end by a disk-shaped wall. A particulate waste entry aperture in the wall surrounding the axial bore is located adjacent the bottom end of the tool body, and an exit aperture is located higher in the tool body. Drive-receiving means is located at the upper end of the tool body. A housing, in which the tool body is rotatably secured with an airtight seal, encloses the portion of the tool body in which the exit aperture is located. The housing provides a space that completely encircles the tool body, and is in communication with the exit aperture at all times. The housing has an outlet opening that can be operatively connected with a conventional suction source and waste disposal system.

18 Claims, 1 Drawing Sheet

U.S. Patent     Dec. 1, 1998     5,842,924
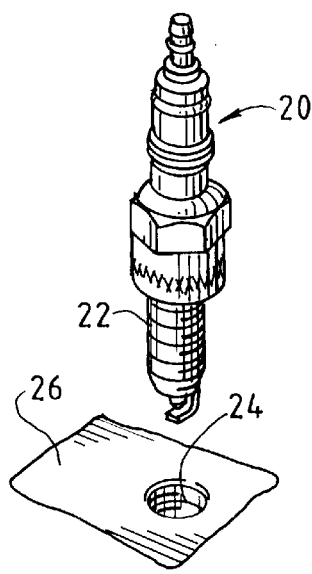
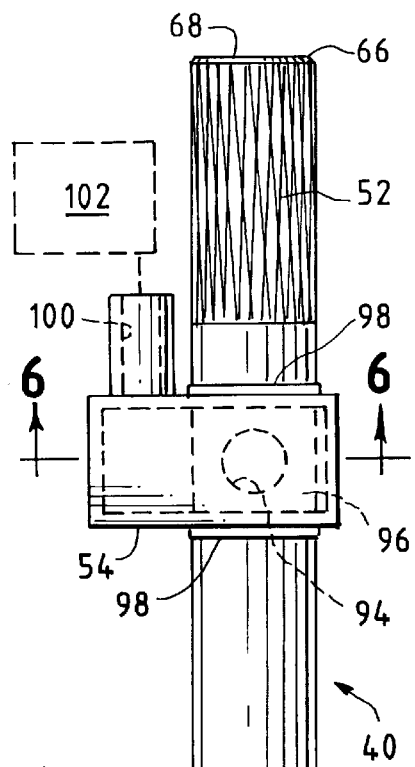
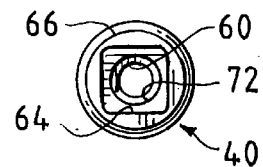
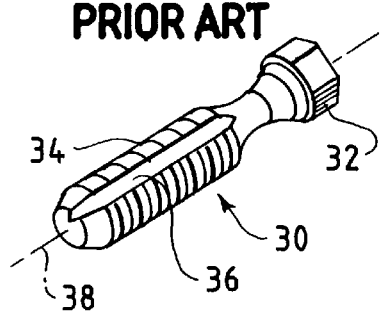
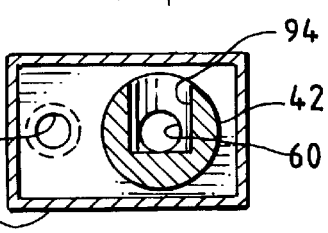
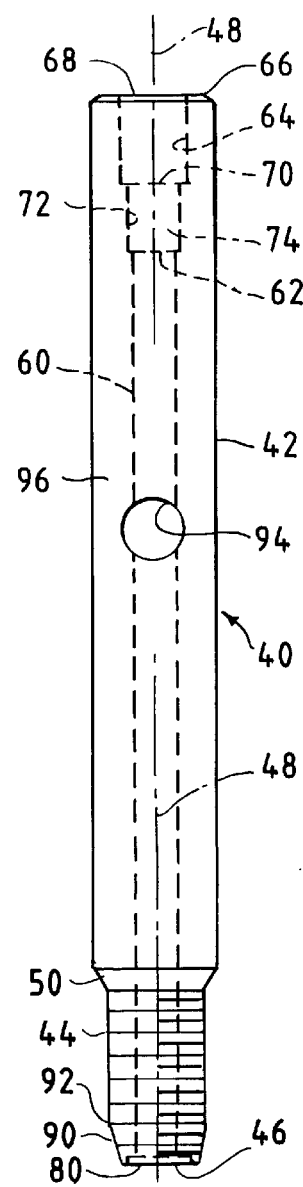

THREAD REPAIRING TOOL

FIELD OF THE INVENTION

The present invention relates to a tool for repairing damaged threads within a bore. In particular, the invention relates to a tool for repairing the threads within a bore in the head of an internal combustion engine without the danger of metallic particulates falling into the engine housing.

BACKGROUND OF THE INVENTION

The fact that the engine housing of an internal combustion engine is frequently made of a softer metal than the threaded bottom portion of a spark plug used in the engine presents a troublesome problem. Such a spark plug tends to damage the threaded opening in which it is inserted when the hard metal thread of the spark plug has burrs or other imperfections on it, especially upon repeated insertion and removal of the spark plug.

A damaged spark plug opening can be repaired in several ways. One way is to remove the engine head, bore out the spark plug opening, rethread the opening, and either replace the original spark plug with a larger diameter spark plug or use an insert to reduce the threaded openings to the proper size.

A much simpler procedure is one in which the engine head is left in place and a thread repairing tool is used to repair whatever damage has occurred to the threads in the spark plug openings in the engine head. However, with this procedure there is a risk that metallic particulates could drop down from the spark plug opening as the threads are being repaired, to fall within the associated cylinder, where they can be caught between valves and their seats and damage the valves. Metallic particulates that drop down from the spark plug opening can also cause problems if they become wedged between the pistons and cylinders of the internal combustion engine.

Various tools have been employed to repair the damaged threads of an opening in an internal combustion engine housing for receiving a spark plug. All fail to provide a reliable means of avoiding the dropping of metallic particulates into the interior of the engine housing that is described above.

One example of a thread repairing tool known in the prior art (which is illustrated in the accompanying drawing) has a generally cylindrical body with a hexagonal head at one end and a threaded section at the other, with an external groove running parallel to the axis of the tool throughout the length of the threaded section.

Another example, disclosed in U.S. Pat. No. 5,259,706 issued to Gaut on Nov. 9, 1993, includes a so-called "particulate retainer" that comprises a flexible, elastomeric, washer-like piece, the diameter of which is somewhat larger than the diameter of the adjacent threaded section, to which it is attached by means of a nonflexible washer-like backing piece.

Another U.S. Pat. No. 5,281,059 which was issued to Stuckel in 1994 discloses a tool for repairing damaged threads in a blind hole, such as a spark plug hole, comprising a tool with an elongated body with the first end defining an expandable fluted tap.

In 1996, U.S. Pat. No. 5,544,985 issued to Lane for a drilling apparatus having a system for circulating fluid to the surface of the work piece and removable through the hollow shaft.

Another drilling apparatus, U.S. Pat. No. 5,253,961 issued to Geissler in 1993, discloses a coupling for drilling machine with dust extractor which provides for a drive member which is rotatably mounted in a housing where the housing member is provided with a connecting member for suction device. The foregoing drilling apparatus reveals no suggestion for engine threading applications.

Also see U.S. Pat. Nos. 5,413,438 issued to Turchan in 1995 and 4,762,444 issued to Mena in 1988 for prior art thread tapping devices having flutes.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

SUMMARY OF THE INVENTION

The thread repairing tool of this invention has a generally cylindrically shaped body with a threaded section at its bottom end. The threaded section terminates in a disk-shaped wall positioned at the end of the tool body transverse to its central axis. An axial bore extends from the disk-shaped wall at the bottom end of the tool body to a terminal point in an upper portion of the tool body. The axial bore is configured and adapted to convey particulate waste.

Means for receiving the drive for the tool is provided at the upper end of the tool body.

At least one particulate waste entry aperture in the wall surrounding the axial bore provides communication between the external space adjacent the bottom end of the tool body and the interior of the bore. At least one exit aperture for particulate waste provides communication between the interior of the axial bore and the external space adjacent the upper terminal point of the axial bore.

A housing surrounds, and encloses with an airtight seal, the portion of the tool body at the location of the exit aperture (or apertures). The housing provides an enclosed space that completely encircles the tool body and is in communication with the exit aperture (or apertures) at all times. The housing has an outlet opening that can be connected to a suction source and waste disposal system. The tool body is rotatable within the tool body housing.

The over-all diameter of the threaded section is preferably less than the diameter of the adjacent section of the tool body.

The particulate waste entry aperture is preferably located immediately adjacent the disk-shaped wall at the bottom end of the tool body. Best results are obtained when the entry aperture is elongated in shape, with a length between about one-sixth and about one-half the length of the threaded section.

In a preferred embodiment of the thread repairing tool of this invention, the wall surrounding the axial bore includes a groove that extends from the outer surface of the disk-shaped wall, past the lower end of the elongated entry aperture, at least to a point on the inner surface of the axial bore wall at the upper end of the aperture. The groove preferably extends farther to a point, on the crest of the threads comprising the threaded section, that is spaced from the bottom end of the tool body by a distance approximately two-thirds the over-all length of the threaded section.

The elongated entry aperture and its associated groove may lie at an acute angle of approximately 10° to 30° to the longitudinal axis of the tool body. The angle is preferably approximately 15°.

In a preferred form of the device, the height of the threads in the threaded section progressively decreases from their standard height, at a point intermediate the ends of the at least one elongated entry aperture, to the bottom end of the tool body. The height of the threads decreases from the height at the intermediate point just mentioned to substantially zero at the bottom end of the tool body.

The drive-receiving means may be a non-circular hole that extends into the tool body from the upper end of the body, and terminates short of the upper terminal point of the axial bore. Any other suitable drive-receiving means may be employed.

ADVANTAGES OF THE INVENTION

The tool of this invention can be used for repairing the threads within a bore in the head of an internal combustion engine without removing the head from the engine, and without risking particulate waste falling into the interior of the engine housing.

The tool is of simple and inexpensive construction, and provides reliable performance.

BRIEF DESCRIPTION OF THE DRAWING

FIG. 1 is a perspective view of a conventional spark plug used in an internal combustion engine, showing a portion of the engine head with the threaded bore into which the spark plug is to be inserted;

FIG. 2 is a perspective view of a tool known in the prior art for repairing the threads within a bore in the head of an internal combustion engine;

FIG. 3 is a side elevation of one embodiment of the thread repairing tool of the present invention;

FIG. 4 is a partial side elevation view of the body of the thread repairing tool of FIG. 3 indicating certain openings in the tool, with the knurled handle omitted and showing the bottom threaded section diagrammatically; and FIG. 5 is a top plan view of the tool body shown in FIG. 4; and FIG. 6 is a cross-sectional view of the thread repairing tool of FIG. 3, taken along the line 6—6 in the latter Figure.

DETAILED DESCRIPTION OF PREFERRED EMBODIMENT

FIG. 1 shows a typical spark plug 20 with a threaded section 22 which is inserted in threaded opening 24 in the head 26 of an internal combustion engine.

FIG. 2 illustrates one of the tools that has been used to repair the damaged threads of a bore in the head of an internal combustion engine in which a spark plug is to be inserted. Tool 30 has a hexagonal head 32 which can be rotated by a wrench or other suitable means. Threaded section 34 is located at the opposite end of the tool. External groove 36, lying generally parallel to the central axis 38 of tool 30, extends throughout the threaded section of the tool.

A preferred embodiment of the thread repairing tool of the present invention is shown in side elevation in FIG. 3. Tool 40 has a generally cylindrically shaped body 42 with a threaded section 44 (shown diagrammatically) at its bottom end. The threaded section terminates in disk-shaped wall 46 positioned at the end of the tool body transverse to its central axis 48.

The diameter of threaded section 44 is less than the diameter of the remainder of the tool body. As a result, shoulder 50 lies between the threaded section and the remainder of the body. This shoulder prevents the thread repairing tool from being screwed too far into the thread hole being repaired.

The upper end 52 of the tool body is knurled to facilitate manual handling of the tool. Housing 54 (described in more detail below) is in this embodiment located in the midportion of the tool body. Axial bore 60, whose central axis coincides with the central axis 48 of the tool body, is shown in dashed lines in FIG. 4. It extends from the inner surface of disk-shaped wall 46 at the bottom end of the tool body to terminal point 62 in the upper portion of the tool body. Bore 60 is configured and adapted to convey metallic particulate waste.

FIG. 5 shows a top plan view of tool body 42. In this embodiment, drive-receiving means 64 is a recess in the upper end of the tool body with a generally square cross section. The recess is adapted to receive the operative end (having a square cross section) of whatever drive means is employed to rotate the thread repairing tool. In this case the upper end of the tool body is beveled at 66 to make the tool easier to grasp. As seen in FIG. 4, square hole 64 extends into the tool body from upper end 68 and terminates at 70 short of upper terminal point 62 of the axial bore.

Cylindrical hole 72 connects axial bore 60 with the non-circular drive-receiving hole 64. Cylindrical dowel pin 74 is fixedly secured in connecting hole 72. The dowel pin may be made of a suitable hardwood material.

As is seen from FIG. 5, the cross-sectional shape of axial bore 60 is small enough to fit loosely within the cross-sectional shape of connecting hole 72, and the latter shape is small enough to fit loosely within the cross-sectional shape of drive-receiving hole 64. These dimensions make possible one method of manufacture of tool body 42, which includes the following steps: (1) hole 60 is bored from one end of body 42 to the other coaxially with central axis 48 of body 42; (2) circular connecting hole 72 is bored coaxially with axis 48; (3) drive-receiving recess 64 is formed; (4) cylindrical dowel pin 74 is fixedly secured in connecting hole 72; and (5) disk-shaped member 46 is fixedly secured at the bottom end of tool body 42 to close off axial bore 60.

As shown in FIG. 3, the wall surrounding axial bore 60 contains particulate waste entry aperture 76, which provides communication between the space external to the tool body and the bore interior. Entry aperture 76 is located adjacent the bottom end of the tool body, immediately adjacent disk-shaped wall 46. In this embodiment, entry aperture 76 is elongated in shape, with a length about one-third the length of threaded section 44.

The wall surrounding axial bore 60 includes groove 78. In the embodiment of FIG. 3, the groove extends upward from the bottom surface of disk-shaped wall 46, past the lowest end of entry aperture 76. It continues upward past a point that is located on the inner surface of the axial bore wall, at the upper end 82 of aperture 76. The groove then proceeds to point 84, at the crest of the threads comprising threaded section 44, which is spaced from the bottom end of the tool body by a distance approximately two-thirds the length of the threaded section.

In the embodiment shown, longitudinal axis 85 of elongated entry aperture 76 and associated groove 78 lies at an acute angle 86 of approximately 15° to axis 48 of the tool body.

The threads of threaded section 44 are shown diagrammatically in FIGS. 3 and 4. Portion 90 of threaded section 44—which portion extends from point 92 intermediate the ends of elongated waste entry aperture 76 to bottom end 80 of the tool body—includes the threads that are first to engage the threads of the hole that are to be repaired by use of the tool of this invention. As indicated in FIGS. 3 and 4, the height of the threads in the portion extending from point 92 to the end of the tool body preferably decreases progressively to substantially zero at the bottom end of the tool body.

Particulate waste exit aperture 94, in the wall surrounding axial bore 60, is located somewhat below upper terminal point 62 of the bore. This aperture provides communication between the bore interior and the space external to the generally cylindrical tool body.

Housing 54 fully encloses, with an airtight seal, the portion 96 of tool body 42 in which exit aperture 94 is located. This arrangement of parts provides a space that completely encircles the tool body, and is in communication with exit aperture 94 at all times.

Housing 54 is rotatable about tool body 42 or, to put it another way, the tool body is rotatable within the housing. As a result, the housing can be held in a fixed position while the thread repairing tool is rotated by the drive means (not shown) during use of the tool. Washers 98 help maintain the airtight seal while tool body 42 is rotated during use of this device.

Housing 54 is provided with an outlet opening 100. Conventional suction source and waste disposal system 102 (shown diagrammatically in FIG. 3) are operatively connected, through a length of flexible hose, to the outlet opening of the housing.

FIG. 6 provides a cross-sectional view, taken along line 6—6 in FIG. 3, of housing 54. The upper end of axial bore 60 in tool body 42 is seen in communication with particulate waste exit aperture 94. Outlet aperture 100 is seen on the left hand side of the Figure.

When the thread repairing tool of this invention is to be used to repair a damaged threaded hole for a spark plug, the tool is first connected to the suction source and waste disposal system through a length of flexible hose. The drive means is then connected to the upper end of the tool. The threaded bottom end of the tool is inserted manually in the threaded bore being repaired, the suction means is activated, and the drive means is activated. As metallic particulates are removed from the damaged threads, they are immediately sucked up through entry aperture 76 and groove 78, from there through axial bore 60 and exit aperture 94, and finally through housing 54 and outlet 100 to the suction source and waste disposal system. This ensures that while the damaged threads are being repaired, none of the particulate waste falls down into the engine head, and thus damage to the engine is avoided.

While this invention has been described in connection with the best mode presently contemplated by the inventor for carrying out his invention, the preferred embodiments described are for purposes of illustration only, and are not to be construed as constituting any limitation on the invention. Modifications will be obvious to those skilled in the art, and all modifications that do not depart from the spirit of the invention are intended to be included within the scope of the appended claims.

I claim:

1. A tool for repairing damaged spark plug threads within a bore of a head that may be attached to an engine block, which comprises:
   (a) a generally cylindrically shaped tool body including:
      (i) a threaded section for rethreading the bore at its bottom end;
      (ii) an axial bore configured and adapted to convey particulate waste, said bore extending from a point adjacent the bottom end of the tool body to an upper terminal point in a higher portion of the tool body, and means for controlling movement of the particulate waste at the bottom end of the tool body that restricts radial and axial movement of the particulate waste through the bottom end of the tool body comprising a disk-shaped wall disposed within the axial bore at the end of the tool body transverse to its central axis,
      (iii) at least one particulate waste entry aperture in the wall surrounding said axial bore, which provides communication between the space external to the tool body and the bore interior, said at least one entry aperture being located adjacent the bottom end of the tool body, said at least one particulate waste entry aperture being bounded on one end by said disk-shaped wall,
      (iv) at least one particulate waste exit aperture in the wall surrounding said axial bore, which provides communication between the bore interior and the space external to the generally cylindrical tool body, said exit aperture being located adjacent said upper terminal point of the bore, and
      (v) drive-receiving means proximate to the upper end of the tool body; and
   (b) a housing fully enclosing, with an airtight seal, the portion of said generally cylindrical tool body in which said at least one exit aperture is located, to provide an enclosed space that completely encircles the tool body and is in communication with said at least one exit aperture at all times,
   said housing having an outlet opening, and the tool body being rotatable within the housing,
      whereby, the disk-shaped wall defines a border of the at least one particulate waste entry aperture thereby restricting radial movement of the particulate waste passing through the at least one particulate waste entry aperture and axial movement of the particulate waste through the bottom end of the tool body.

2. The thread repairing tool of claim 1 in which the over-all diameter of said threaded section is less than the diameter of the adjacent section of the tool body.

3. The thread repairing tool of claim 1 in which said at least one particulate waste entry aperture extends axially along a segment of the tool body in which the height of the threads in the segment of said threaded section progressively decrease from the standard height of the threads to substantially zero adjacent the bottom end of the tool body.

4. The thread repairing tool of claim 1 in which said at least one particulate waste entry aperture is elongated in shape, having a length between about one-sixth and one-half the length of said threaded section.

5. The thread repairing tool of claim 4 in which the wall surrounding said axial bore includes a groove that extends upward from (a) the lowest end of said at least one elongated entry aperture to (b) a point on the inner surface of said axial bore wall, at the upper end of said at least one elongated entry aperture.

6. The thread repairing tool of claim 5 in which said groove extends farther upward to a point, at the crest of the threads comprising said threaded section, that is spaced from the bottom end of the tool body by a distance approximately two-thirds the over-all length of the threaded section.

7. The thread repairing tool of claim 6 in which said groove extends upward from the outer surface of said disk-shaped wall.

8. The thread repairing tool of claim 5 in which the longitudinal axis of said at least one elongated entry aperture and its associated groove lies at an acute angle of approximately 10° to 30° to the longitudinal axis of the tool body.

9. The thread repairing tool of claim 8 in which said acute angle is approximately 15°.

10. The thread repairing tool of claim 5 in which the height of the threads in the portion of said threaded section extending from (a) a point that is intermediate the ends of said at least one elongated particulate waste entry aperture to (b) the bottom end of the tool body progressively decreases from the standard height of the threads at said intermediate point, to substantially zero at the bottom end of the tool body.

11. The thread repairing tool of claim 1 in which said drive-receiving means is a non-circular hole that extends into the tool body from the upper end thereof and terminates short of said upper terminal point of the axial bore.

12. The thread repairing tool of claim 11 which includes:
(a) a cylindrical hole in the tool body connecting said axial bore with said non-circular drive-receiving hole; and
(b) a cylindrical dowel pin fixedly secured in said connecting hole.

13. The thread repairing tool of claim 12 in which the cross-sectional shape of said axial bore is small enough to fit loosely within the cross-sectional shape of said connecting hole, and the cross-sectional shape of the connecting hole is small enough to fit loosely within the cross-sectional shape of said drive-receiving hole.

14. The thread repairing tool of claim 13 in which said axial bore is circular in cross section, and said connecting hole is circular in cross section.

15. A tool for repairing damaged spark plug threads within a bore of a head that may be attached to an engine block, which comprises:
(a) a generally cylindrically shaped tool body including:
  (i) a threaded section for rethreading the bore at its bottom end having an over-all diameter less than the diameter of the adjacent section of the tool body,
  (ii) a cylindrically shaped axial bore for conveying particulate waste, said bore extending from said disk-shaped wall at the bottom end of the tool body to an upper terminal point in a higher portion of the tool body, and means for controlling movement of the particulate waste at the bottom end of the tool body that restricts radial and axial movement of the particulate waste through the bottom end of the tool body comprising a disk-shaped wall disposed within the axial bore at the end of the tool body transverse to its central axis,
  (iii) at least one particulate waste entry aperture in the wall surrounding said axial bore, which provides communication between the space external to the tool body and the bore interior, said at least one entry aperture being elongated in shape and located immediately adjacent said disk-shaped wall, said at least one particulate waste entry aperture being bounded on one end by said disk-shaped wall, with its longitudinal axis at approximately 15° to the longitudinal axis of the tool body,
  the height of the threads in the portion of said threaded section extending from ($a^1$) a point that is intermediate the ends of said at least one elongated particulate waste entry aperture to ($b^1$) the bottom end of the tool body progressively decreases, from the standard height of the threads at said intermediate point to substantially zero at the bottom end of the tool body,
  (iv) a groove in the wall surrounding said axial bore that extends upward, with its longitudinal axis at approximately 15° to the longitudinal axis of the tool body, from ($a^1$) the outer surface of said disk-shaped wall to ($b^1$) a point on the inner surface of said axial bore wall, at the upper end of said at least one elongated entry aperture, to ($c^1$) a point, at the crest of the threads comprising said threaded section, that is spaced from the bottom end of the tool body by a distance approximately two-thirds the length of said threaded section,
  (v) at least one particulate waste exit aperture in the wall surrounding said axial bore, which provides communication between the bore interior and the space external to the generally cylindrical tool body, said exit aperture being located adjacent said upper terminal point of the axial bore, and
  (vi) drive-receiving means proximate to the upper end of the tool body, said means having the form of a non-circular hole extending into the tool body from the upper end thereof and terminating short of said terminal point of the axial bore; and
(b) a housing fully enclosing, with an airtight seal, the portion of said generally cylindrical tool body in which said at least one exit aperture is located, to provide an enclosed space that completely encircles the tool body and is in communication with said at least one exit aperture at all times,
said housing having an outlet opening,
whereby, the disk-shaped wall defines a border of the at least one particulate waste entry aperture thereby restricting radial movement of the particulate waste passing through the at least one particulate waste entry aperture and axial movement of the particulate waste through the bottom end of the tool body, and the tool body being rotatable within the housing.

16. The thread repairing tool of claim 14 which includes:
(a) a cylindrical hole in the tool body connecting said axial bore with said non-circular drive-receiving hole; and
(b) a cylindrical dowel pin fixedly secured in said connecting hole.

17. The thread repairing tool according to claim 1 wherein a suction source and waste disposal system is operatively connected through a length of flexible hose, to the outlet opening in said housing.

18. The thread repairing tool according to claim 15 wherein a suction source and waste disposal system is operatively connected through a length of flexible hose, to the outlet opening in said housing.

* * * * *